March 24, 1970     G. SCHRADER     3,502,004
PISTON-AND-CYLINDER ARRANGEMENT FOR A WHEEL BRAKE
Filed July 9, 1968     2 Sheets-Sheet 1
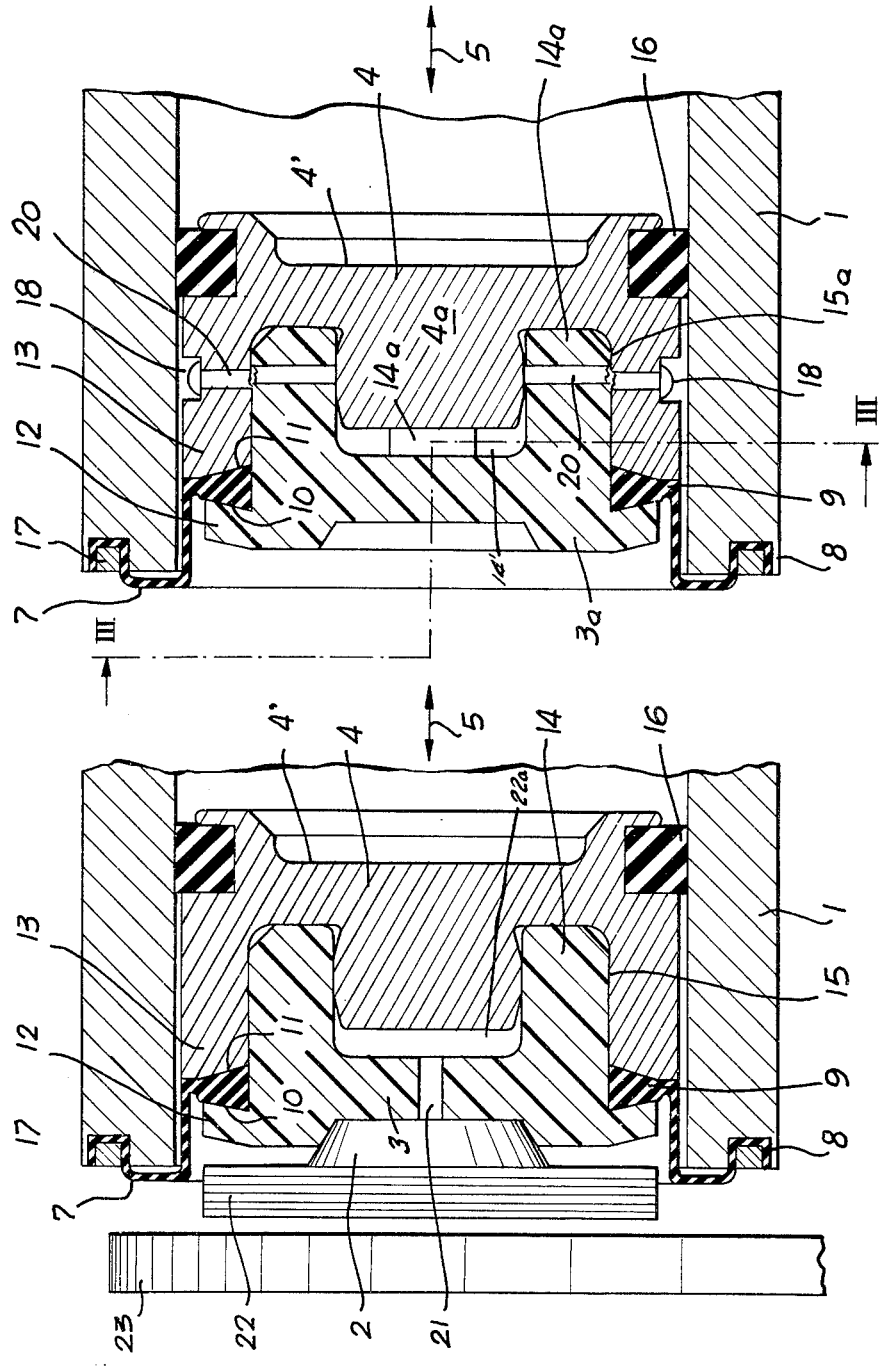
INVENTOR,
GERT SCHRADER

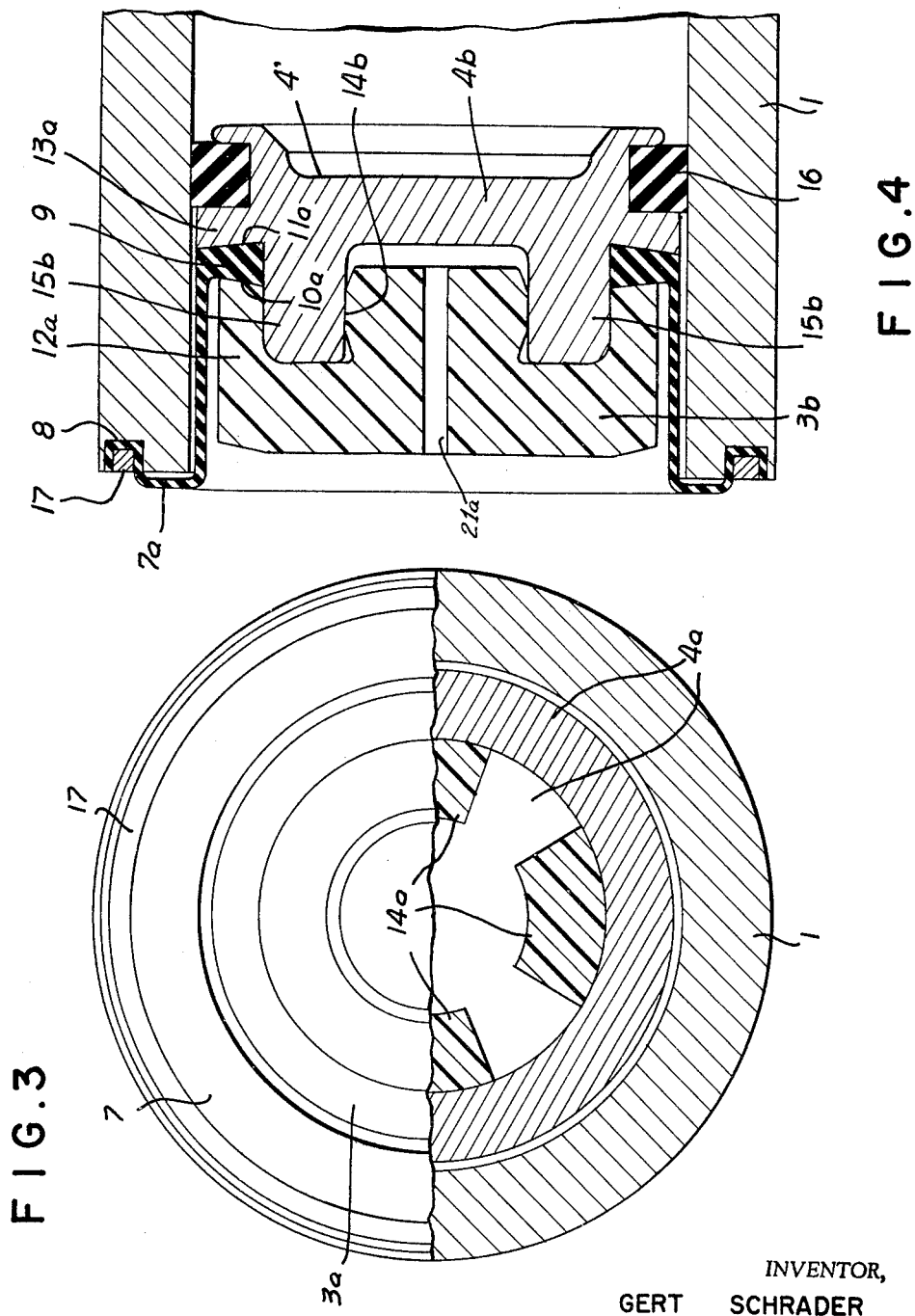

United States Patent Office 3,502,004
Patented Mar. 24, 1970

3,502,004
PISTON-AND-CYLINDER ARRANGEMENT
FOR A WHEEL BRAKE
Gert Schrader, Walldorf, Hesse, Germany, assignor to Alfred Teves G.m.b.H., Frankfurt am Main, Germany, a corporation of Germany
Filed July 9, 1968, Ser. No. 743,490
Claims priority, application Germany, July 21, 1967, T 34,371
Int. Cl. F16j 1/10, 15/18, 15/50
U.S. Cl. 92—129          5 Claims

ABSTRACT OF THE DISCLOSURE

A piston for an automotive wheel brake having two telescopingly interfitted relatively movable parts, the front body being composed of synthetic resin and bearing against the brakeshoe while the rear part is of metal and is acted upon by the hydraulic fluid. An inner periphery of an elastomeric sealing cuff for sealing the brake against influx of contaminants is clamped between these parts.

---

My present invention relates to a piston-and-cylinder arrangement for use in a wheel brake, and more particularly to a relatively corrosion-proof and watertight arrangement for hydraulically operable disk brakes.

Because of the relatively exposed location of a disk-type brake over that of a drum-type brake (on the chassis or body of an automotive vehicle), the danger of corrosion due to the entrance of water, foreign bodies or other contaminants into its mechanism and into the finished surfaces of the hydraulic cylinder or into the fluid is a particular problem. Generally speaking, the solution to this problem is to form the cylinder and the piston with grooves into which a cuff is fitted, usually held in place by retaining rings. This may make for an imperfect seal, since the frequent motion of the piston often loosens this cuff, usually at the piston, enough to allow some moisture to get past it and corrode the interior of the mechanism. In addition, the metallic exposed center of the piston not sealed by the ring is likely to rust.

It is an object of my invention to provide a piston arrangement for a brake wherein an extremely snug, watertight and dust-tight seal is possible and wherein the piston is not likely to corrode.

This object is achieved according to the main feature of my invention by using a two-part piston having a front body or part of synthetic resin acting upon the brakeshoe and a rear body or part of metal against which the brake-actuation force, hydraulic or mechanical, acts. The cuff is clamped between these two telescopingly interfitted parts which are interengaged by press fitting and/or shearable rivets. According to an important feature of the invention, the two parts are relatively displaceable and releasably interfitted or joined to allow disposal of the synthetic-resin body when replacement is required, and to permit the relative, albeit slight, axial displacement of these bodies which maintains the thickened bead (enlarged cross section) of the cuff under compression.

The rear of the front part and the front of the rear part may thus be formed with interengageable locking formations to hold the two bodies together. These formations are preferably formed as an annular ridge or projection and a corresponding annular cavity, or angularly spaced projections with a corresponding array of angularly spaced recesses.

With such a piston arrangement only the face of the noncorrodible synthetic-resin body is exposed to the water and dirt which penetrate into the brake housing, thus eliminating the above-mentioned corrosion problem. The expedient of clamping the inner periphery of the cuff between the two parts makes for an extremely snug seal which offers near-perfect waterproofing characteristics, since the constant action of the brakes serves to tighten the seal rather than to loosen it. In the unoperated condition of the brake, the peripheral bead of the resilient cuff is free to expand inasmuch as an air space between the two piston parts communicates with the exterior and thus facilitates their axial separation.

According to a further feature of my invention, the front part is made of "Trolitan," a filled heat- and compression-resistant pressed phenolic resin. The rear part is preferably made of die-cast "Zamak," a zinc-copper-aluminum alloy.

The above and other objects, features and advantages will become more readily apparent from the following description, reference being made to the accompanying drawing in which:

FIG. 1 is an axial section through a piston arrangement according to my invention, here applied to a disk brake;

FIG. 2 is a similar section through a piston arrangement according to a second embodiment of my invention;

FIG. 3 is a section taken along line III—III of FIG. 2; and

FIG. 4 is a section similar to those of FIGS. 1 and 2 but illustrating a third embodiment of my invention.

FIG. 1 shows a cylinder 1 in which a piston sealed by a sealing ring 16 and made up of a front body 3 and of a rear body 4 may move back and forth in the direction of arrow 5 under the influence of hydraulic pressure applied to its surface 4'. The front body 3 can carry a force-transmitting member 2 which mounts a brakeshoe 22 engageable with a brake disk 23 or may merely act upon the brakeshoe backing plate directly. Axial movement of the piston 3, 4 to the left in FIG. 1 brings the shoe 22 to bear against the disk 23 for braking action.

The front body 3 advantageously consists of a pressed phenolic resin with about 40% filler. This filler can be sawdust, cellulose particles, textile particles, asbestos or anything similar thereto and is worked into a phenolic resin. After heating and polymerization the mass is hardened in steel molds at 140–170° C. under a pressure of at least 150 kg./cm.² The filler serves to absorb the water released in the condensation step during the pressing operation and to raise the mechanical solidity of the finished formed pieces. These pieces are heat and corrosion resistant so that with a maximum of 80° C. heat in the brakeshoes caused by heavy use, there need be no fear of melting the piston front body 3 which remains firm up to 150° C.

The rear body 4 of the piston is composed of "Zamak." This is a copper-aluminum-zinc alloy known for its lightness and strength.

An elastomeric (oil-resistant rubber) cuff 7 is anchored in a groove 8 in the open cylinder end by means of a retaining ring 17. An inner periphery or bead 9 of this cuff 7 is of increased thickness and is formed of trapezoidal configuration, having flanks converging outwardly. Edge portions 12 and 13 of the parts 3 and 4 respectively have confronting annular faces 10 and 11 between which this bead 9 fits so that braking action only better compresses it. The annular faces 10 and 11 are generally frustoconical with similar apex angles but opposite convergencies toward the axis of the cylinder so that they define between them an outwardly open groove or channel of a cross section similar to that of the wedge-shaped bead 9 but of an axial width diminishing as the parts 3, 4 telescope into one another.

The synthetic-resin body 3 is formed with an annular, axially extending projection 14 which matches a circular cavity or groove 15 in the face of the part 4. Thus the body 3 can, effectively, be plugged into the body 4 with the periphery 9 of the cuff 7 squeezed between them. These two bodies 3 and 4 are fitted together while air caught between them can escape through a bore 21. Since the interventing air space 22a constantly communicates through this bore with the exterior, the bead 9 may re-expand as the bodies 3 and 4 separate upon the cessation of the pressure of an operating fluid on piston part 4.

FIGS. 2 and 3 show an arrangement similar to that described above. The synthetic-resin body 3a plugs into part 4a as above, but here, instead of a single annular flange, the part 3a is formed with a plurality of projections 14a received in matching recesses 15a. This is advantageous to prevent any rotation of body 3a relative to the body 4a due to the long-recognized tendency of the brake-shoe to twist during braking.

This part 3a is riveted to hold it in the part 4a by shearable radial rivets 20 passing through the projections 14a and countersunk in counterbores 18 in the part 4a. The rivets allow preassembly of the parts (i.e. the synthetic-resin body 3a, the metallic body 4a and the seal 7) prior to insertion of the piston into the cylinder. Initial brake operations cause the rivets to shear (FIG. 2) and allow separation of the bodies and the requsitite axial displaceability for effective sealing action.

Because of the shape of the part 3a (i.e. the use of a number of feet 14a rather than a single flange), i.e. the presence of gaps between these feet as indicated at 14', no air can be captured behind it when pressing it into the part 4a so that no central bore such as the bore 21 (FIG. 1) is necessary.

FIG. 4 represents essentially a kinematic reversal of the embodiment of FIG. 1. Here the synthetic-resin body 3b is formed with an axially open annular groove 14b and the metallic rear body 4b with an annular projection or boss 15b. These two interfit to form a trapezoidal channel between portions 12a and 13a of the two parts 3b and 4b, respectively, with faces 10a and 11a to hold an end 9a of a cuff 7a. With this embodiment, a hole 21a is necessary to vent the air captured between the two parts 3b and 4b as they are pressed together.

Installation of the piston arrangement is not difficult with my invention. Either the cuff periphery 9 can be engaged between the two bodies 3 and 4 and then the assembled piston inserted in the cylinder 1 after which the outer periphery of the cuff 7 can be fixed in the groove 8 by means of the retaining ring 17, or the body 4 can be slid into the cylinder 1, then the cuff 7 put in place at its outer and inner peripheries, and then the front body 3 pushed into place. This latter method is impossible with the FIG. 2 embodiment but lends itself particularly to replacement of the cuff 7 in a filled cylinder.

It is also worth noting that the bore 21a can serve in separating the two parts 3 and 4 by the expedient of forcing a screw into it to drive them apart. Once again, this is useful with the FIGS. 1 and 4 embodiments when the cuff 7 must be changed in a full wheel cylinder 1 without having to go through the bother of draining it.

I claim:
1. A piston-and-cylinder assembly adapted to operate a load, comprising:

a fluid cylinder having an axially open end;
a piston axially displaceable in said cylinder under the pressure of an operating fluid admitted into said cylinder, said piston including a metallic body in fluidtight contact with the peripheral cylinder walls and a synthetic-resin body slidably mounted on said metallic body in radially spaced relationship from said cylinder walls and facing said open end for contacting the load, said bodies being provided with generally transverse confronting peripheral surfaces converging outwardly toward said cylinder walls, said bodies enclosing between them an air space communicating with the exterior; and
an elastic sealing cuff attached to the open end of said cylinder and extending inwardly therefrom around said synthetic-resin body into peripheral contact with the latter and with said metallic body, said cuff having an inner peripheral bead of wedge-shaped cross-section matingly received between said confronting surfaces for compression therebetween upon exertion of operating pressure on said piston, said bodies being axially separable upon the cessation of said operating pressure whereby said bead is free to re-expand between said confronting surfaces.

2. The assembly defined in claim 1 wherein one of said bodies is formed with an annular ridge and the other of said bodies is formed with an annular cavity snugly receiving said ridge.

3. The assembly defined in claim 1 wherein said synthetic-resin body is composed of a hardened, filled phenolic resin and the metallic body is composed of a copper-aluminum-zinc alloy.

4. The assembly defined in claim 1 wherein said synthetic-resin body is formed with a plurality of axial projections in angularly equispaced relation and said metallic body is formed with a corresponding number of complementary recesses therefor.

5. The assembly defined in claim 1, further comprising temporary holding means for fixing said bodies together with said bead between them, said holding means including at least one shear rivet.

References Cited

UNITED STATES PATENTS

| | | | |
|---|---|---|---|
| 1,885,121 | 11/1932 | Loweke | 74—18.2 |
| 2,801,714 | 8/1957 | Dotto | 188—152 |
| 3,040,712 | 6/1962 | Harratt | 92—248 X |
| 3,195,360 | 7/1965 | Burnett | 74—18.2 |
| 3,274,904 | 9/1966 | Jacoby | 188—264 |
| 3,298,470 | 1/1967 | Russell | 92—100 X |

FOREIGN PATENTS

| | | |
|---|---|---|
| 1,320,022 | 1/1963 | France. |

GEORGE E. A. HALVOSA, Primary Examiner

U.S. Cl. X.R.

74—18.2; 92—168; 188—100, 264